United States Patent Office
3,092,616
Patented June 4, 1963

3,092,616
DISAZO DYES
Ermanno Gaetani, Milan, Italy, assignor to Aziende Colori Nazionali Affini Acna S.p.A., Milan, Italy, a corporation of Italy
No Drawing. Filed Apr. 14, 1960, Ser. No. 22,126
Claims priority, application Italy Dec. 15, 1959
3 Claims. (Cl. 260—186)

An object of the present invention is to provide certain new water insoluble disazo dyes of the general Formula A

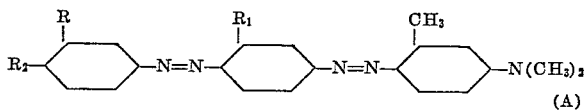

wherein R is selected from the group consisting of hydrogen, chlorine and trifluoromethyl, $R_1$ is selected from the group consisting of chlorine and alkyl radical and $R_2$ is selected from the group consisting of hydrogen and nitrogroup.

The dyes comprised in the above mentioned general Formula A are suitable for direct dyeing of polyolefinic materials by simple application at the boiling temperature of the dyeing bath.

Among the dyes comprised in general Formula A, the following dyes have shown to be particularly suitable to dye polypropylene and polyethylene materials:

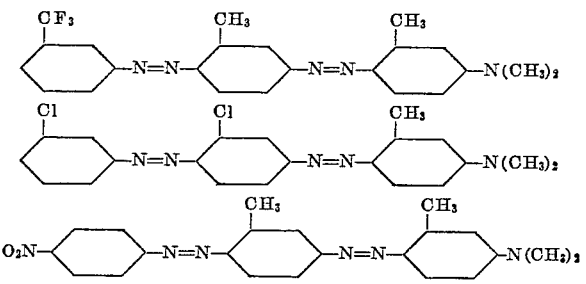

The compounds comprised in general Formula A, are obtained by coupling one mol of an amino azo compound of the type:

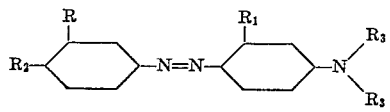

wherein R, $R_1$ and $R_2$ have the above mentioned meaning, $R_3$ is hydrogen, with one mol of a compound of the type:

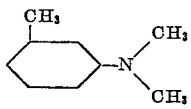

The following examples will further illustrate my invention however without limiting its scope. (All parts are by weight unless otherwise indicated.)

Example 1

25.6 g. 4-amino-2-methyl-4'-nitroazobenzene are diazotised in 250 g. water, 30 g. dimethylformamide and 40 g. hydrochloric acid solution (density 1.17) by the addition of 7 g. $NaNO_2$ in 20 g. water and keeping the temperature at about 10–15° C. The diazo-azo compound obtained is introduced into a solution of 14.5 g. N,N-dimethyl-meta toluidine in 200 g. water and 15 g. hydrochloric acid solution; after addition of the diazo compound, a 50% aqueous sodium acetate solution is gradually added until the mass does not present any acid reaction with a Congo red indicator.

The disazoic dye obtained is filtered, washed and dried; it consists of a brownish-red powder (melting point 240° C.) having the formula:

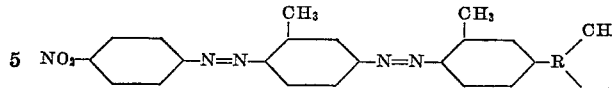

By paper chromatography it gives a uniform red spot which turns to violet with hydrochloric acid and remains unaltered with sodium hydroxide.

Example 2

26.6 g. 4-amino-2,3'-dichloro-azobenzene are diazotised as usual in 300 g. water and 35 g. HCl (sp. gr. 1.17) by addition of a solution of 7 g. $NaNO_2$ in 20 g. water and keeping the temperature at about 10 to 15° C. The diazo-azo compound obtained is coupled with a solution of 14.5 g. N,N-dimethyl-meta toluidine as described in Example 1. The disazo dye obtained is a brownish-red powder with a melting point of 148° C., having the formula:

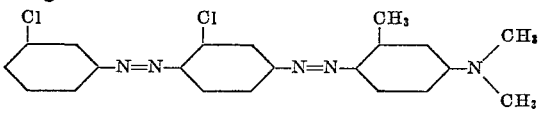

By paper chromatography it gives a violet-red spot which does not turn with acids or alkalies.

Example 3

27.9 g. 4-amino-2-methyl-3'-trifluoro-methyl-azobenzene are diazotised as usual and the diazo-azo compound obtained is coupled with a solution of 14.5 g. N,N-dimethyl-meta-toluidine operating as described in Example 1. The disazo dye obtained, having the formula:

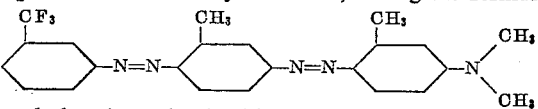

is a dark red powder (melting point 121° C.).

By chromatography it presents a uniform red spot which turns to violet with acids, and remains unaltered with alkalies.

Having thus described my invention, what I desire to secure and to claim by Letters Patent is:

1. A disazo dye, insoluble in water, selected from the group consisting of dyes having the formulae:

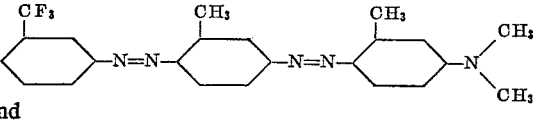

and

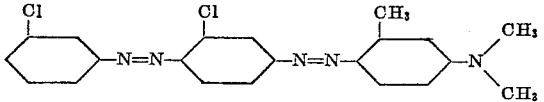

2. A disazo dye, insoluble in water, having the formula:

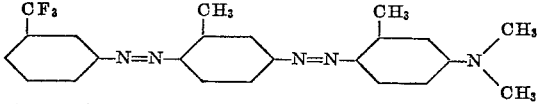

3. A disazo dye, insoluble in water, having the formula:

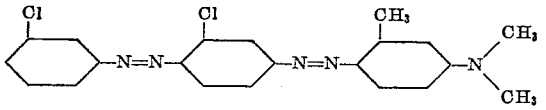

References Cited in the file of this patent
UNITED STATES PATENTS 2,289,413 Ellis et al. _____ July 14, 1942
2,424,627 Olpin et al. _____ July 29, 1947